UNITED STATES PATENT OFFICE.

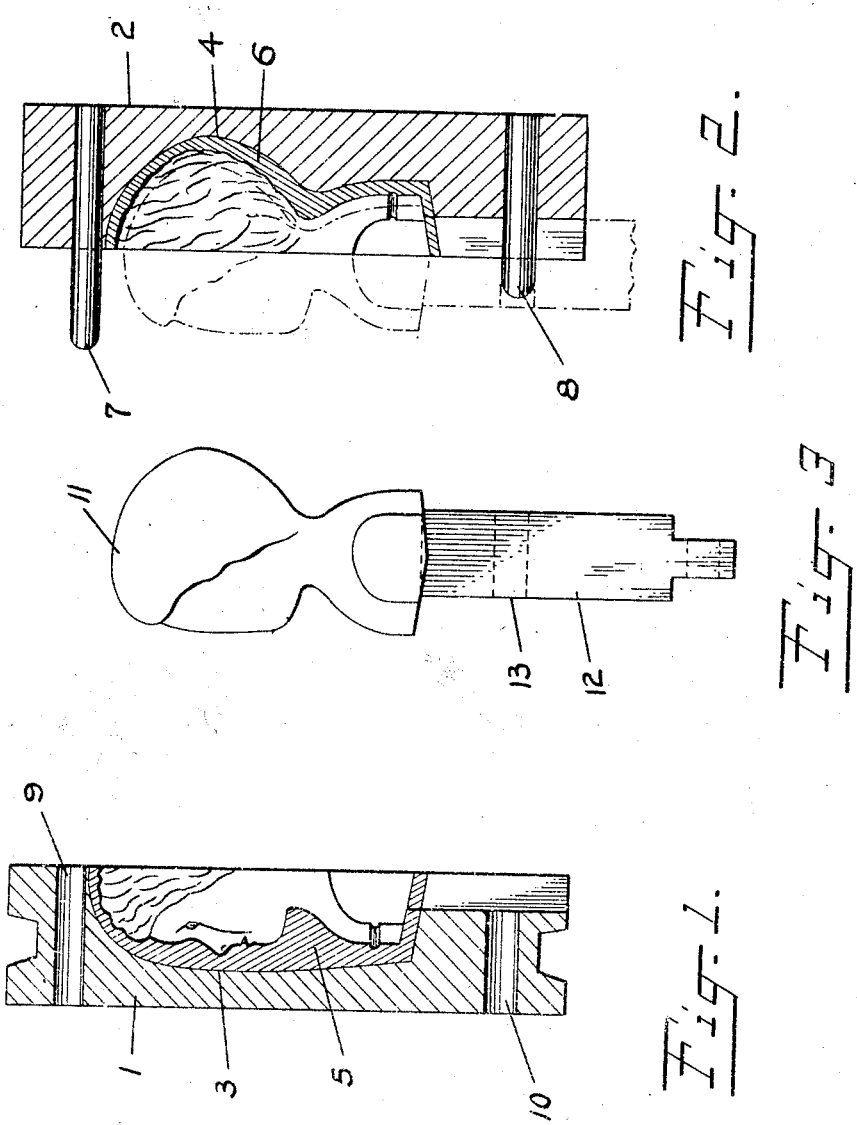

ALEX CHATELAIN, OF AKRON, OHIO, ASSIGNOR TO THE MECHANICAL RUBBER CO., A CORPORATION OF NEW JERSEY.

PROCESS OF MAKING DOLL-HEADS.

1,209,118.  Specification of Letters Patent.  Patented Dec. 19, 1916.

Application filed December 28, 1915. Serial No. 69,043.

*To all whom it may concern:*

Be it known that I, ALEX CHATELAIN, a citizen of the United States, residing in Akron, county of Summit, State of Ohio, have invented certain new and useful Improvements in Processes of Making Doll-Heads, of which the following is a full, clear, and exact description.

My invention relates to the manufacture of hollow articles in which the outer surface is required to be made in the form of nicely chiseled or sharply defined lines having definite designs, such as those required on the heads of dolls, or similar articles.

The object of my invention is to produce such articles with a minimum of expense and with a greater degree of accuracy and freedom from defects than has heretofore been accomplished.

For a detailed description of one manner of carrying out my invention, reference may be had to the following specification and to the accompanying drawing, in which:

Figure 1 is a longitudinal sectional view of one-half of the mold in which the article is formed; Fig. 2 is a longitudinal sectional view of the complementary part of said mold; and Fig. 3 is a side elevation of a core for said mold.

Referring to the drawing, the numerals 1 and 2 indicate two mold sections, preferably made of cast iron, or any other suitable rigid material, having recesses 3 and 4 therein. These recesses 3 and 4 are lined with a suitable moldable metal, such as white metal, as indicated by 5 and 6. This metal is provided with an inner surface corresponding to the configuration of the article to be molded and this surface is obtained by casting said white metal about a suitable core having the shape of the article to be formed in rubber or other plastic material. This casting or forming of the white metal is preferably done under pressure so as to give the inner surface thereof a bright and polished character which will require no subsequent finishing or treatment.

The mold parts 1 and 2 are also provided with suitable dowel pins 7 and 8 which enter suitable holes or sockets 9 and 10 in the opposite part of the mold. The hollow interior of the doll-head or similar article is formed by means of a separable core 11 having an outwardly extending shank or support 12, preferably provided with a hole 13 through which one of the dowel pins passes. This support is preferably made of steel and the core portion of the mold of aluminum which is cast of the requisite size and approximate shape of the article to be formed.

The method of making the doll-head or similar article is as follows: The two sections of the mold are first heated to a temperature corresponding to about 80 lbs. steam pressure, after which the molds are coated with some suitable material such as soap to prevent the stock sticking to the mold surface. Suitable rubber or similar stock in sheet form is cut to the proper size and smaller pieces of stock are cut and placed on these pieces at points where greater thickness of the finished article is required. After the stock has thus been prepared, the piece to form the face is laid in the corresponding section of the mold, the core placed in position upon the same, and the piece of stock to form the back of the head is then laid upon the core. The second section of the mold is then placed in position upon the other parts thus assembled and the whole put into a vulcanizing press and rubber cured at a temperature corresponding to about 80 lbs. steam pressure. When the curing process has been completed, the mold is removed from the press and the parts separated. The head portion of the article is then stripped from the core, trimmed and cleaned. The entire head is then dipped in a rubber cement solution, colored to simulate a flesh color, and allowed to dry. The features of the face are then brought out by applying a small quantity of properly colored cement at the proper points, such as the eyebrows, cheeks, mouth and hair. Thus an article is produced which is completely flexible and unbreakable, composed entirely of rubber composition and of extreme delicacy and accuracy of form. This is accomplished by reason of the fact that the formation of the walls of the head portion is brought about under heavy pressure between the mold parts and the core so that the material is thoroughly compacted and forced into all the recesses in the mold sections. This result has been found not possible to produce by the use of mold sections only, in which the rubber is expanded by the force of some volatile or gaseous substance under pressure contained within the same.

Having thus described my invention, what I claim and desire to protect by Letters Patent is:

The process of forming hollow articles having minute interstices or recesses, and with variously colored or tinted portions, which comprises forming said article about a heated core by inclosing the same in heated mold sections under external pressure, vulcanizing, stripping said article from said core, finishing the surface thereof, and then applying rubber cement containing coloring matter to the various portions thereof.

Signed at Akron, Ohio, this 7th day of September, 1915.

ALEX CHATELAIN.